(12) United States Patent
Bockman

(10) Patent No.: US 6,179,407 B1
(45) Date of Patent: Jan. 30, 2001

(54) MULTI-PASS INKJET PRINTER SYSTEM AND METHOD OF USING SAME

(75) Inventor: Francis E. Bockman, San Diego, CA (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/197,291

(22) Filed: Nov. 20, 1998

(51) Int. Cl.[7] ................ B41J 2/145; B41J 2/15; B41J 23/00; B41J 29/393

(52) U.S. Cl. .................. 347/40; 347/37; 347/19

(58) Field of Search ................. 347/40, 15, 37, 347/41, 12, 19; 395/117, 109; 358/518, 298

(56) References Cited

U.S. PATENT DOCUMENTS

| | | | |
|---|---|---|---|
| 4,930,018 | 5/1990 | Chan et al. | 358/298 |
| 5,031,050 | 7/1991 | Chan | 258/298 |
| 5,111,302 | 5/1992 | Chan et al. | 358/298 |
| 5,140,432 | 8/1992 | Chan | 358/298 |
| 5,313,287 | 5/1994 | Barton | 358/458 |
| 5,333,243 | 7/1994 | Best et al. | 395/109 |
| 5,337,160 | 8/1994 | Jones | 358/447 |
| 5,377,024 | 12/1994 | Dillinger | 358/502 |
| 5,402,245 | 3/1995 | Motta et al. | 358/298 |
| 5,473,446 | 12/1995 | Perumal, Jr. et al. | 358/523 |
| 5,485,180 * | 1/1996 | Askeland et al. | 347/15 |
| 5,506,699 | 4/1996 | Wong | 358/456 |
| 5,508,826 | 4/1996 | Lloyd et al. | 358/501 |
| 5,537,228 | 7/1996 | Dillinger | 358/502 |
| 5,579,446 | 11/1996 | Naik et al. | 395/109 |
| 5,621,545 | 4/1997 | Motta et al. | 358/518 |
| 5,657,137 | 8/1997 | Perumal, Jr. et al. | 358/502 |
| 5,677,716 * | 10/1997 | Cleveland | 347/37 |
| 5,704,021 | 12/1997 | Smith et al. | 395/109 |
| 5,883,644 * | 3/1999 | Nicoloff, Jr. et al. | 347/12 |

* cited by examiner

Primary Examiner—Thinh Nguyen
(74) Attorney, Agent, or Firm—Jerry R. Potts (57) ABSTRACT

An inkjet color printer accesses image data to be printed on a pixel by pixel basis and determines the Z number of drops of different color inks to distribute per pixel over a predetermined number of passes in a multi-pass print mode of operation. Predetermined constraints relative to the maximum number of drops of a single ink color per pixel and per pass permit maskless drop ordering and an even distribution of ink over time per pixel.

26 Claims, 8 Drawing Sheets

MULTI-PASS INKJET PRINTER SYSTEM AND METHOD OF USING SAME

TECHNICAL FIELD

This invention relates to masking methods for multi-pass inkjet printers and more particularly, to a masking method for facilitating the depositing of indicia forming material onto a print medium without creating any substantially observable artifacts.

BACKGROUND OF THE INVENTION

Computer printers are efficient, quiet and produce high quality printed images in a relatively inexpensive manner when operated in low speed printing modes. Image quality is achieved by sweeping indicia depositing apparatus over a print medium and depositing indicia forming material onto the medium in desired indicia patterns. The combined effect of sweeping, depositing and sequentially moving the medium through a predetermined print zone in a series of desired steps, enables the formation of a series of swaths that define a desired image configured in an N by M image matrix array. The quality of the print image is then determined by applying the indicia forming material in a precise manner to the individual pixel locations on the print medium without any substantial coalescence.

While low speed printers have been satisfactory for many applications, there has been a constant demand for printers to produce higher quality photo-like full color images. Meeting the demand for producing photo quality, high color density images however, has not been achieved easily. In this regard, in order to produce full vibrant colors on a print medium, large volumes of indicia forming material must be deposited in concentrated areas on the medium. While depositing large volumes of indicia forming material on a print medium produces vibrant colors, such large deposits in adjacent pixel locations often result in some form of coalescence or observable artifacts.

One common form of indicia forming material utilized in modern day computer printers, such as inkjet printers, is ink carried in a water based media. The water based ink solution permits the deposit of large volumes of ink in a fast and efficient manner. The quality of the ink patterns formed on the print medium is then highly dependent upon the volume of the individual ink droplets and the accuracy in their placement on the medium pixel locations.

While inkjet printers produce high quality photo-like images, it is well known to those skilled in the art, that droplet size and placement accuracy degrade with time due to mechanical and electrical fatigue factors associated with the print head nozzles of such printers. Such nozzle fatigue factors generally manifest in pattern-like printing errors that are quite noticeable to a user particularly when printing in a single pass-printing mode.

In order to help extend the useful life of such print heads, many inkjet printers have employed what is known as a multi-pass print mode of operation that facilitates the hiding of individual nozzle failures. For example as a comparison, in a single pass mode, should a given nozzle not fire perfectly, be misdirected, or clog and fail, the degradation in print quality will be seen in each row of the image printed by the defective nozzle. On the other hand, in a multi-pass print mode of operation each row is printed by two or more nozzles. In this manner, for example, in a four pass print mode printer only one out of four ink droplets may be missing or misdirected resulting in a much less catastrophic result. While multi-pass printing has helped improve image quality, the improvement has been at the expense of throughput.

One attempt at helping to improve throughput while simultaneously addressing the problems associated with coalescence as well as bleeding and beading of ink droplets between adjacent pixel locations is disclosed in U.S. Pat. No. 4,748,453. In this regard, there is taught an ink jet printing method for depositing drops of ink in a checkerboard pattern through the use of a mask. The use of the mask assures that there is no overlap of ink drops from adjacent pixel areas when the ink is still in a flowable state. While the dividing the ink drop deposits into separate and distinct complementary areas has improved the problems associated with coalescence, such masking techniques have not entirely solved the problems associated with coalescence since ink deposits between diagonally oriented pixel locations still exhibit coalescence. Moreover, the use of small masks, such as 2×2 masks and 4×4 masks, produce artifacts as the fixed mask configuration is applied in a highly repetitive manner. For example, a 2×2 mask is typically applied every two pixels causing a repetitive pattern to be stamped out every two pixels in both the horizontal and vertical directions and especially in the horizontal direction. Such a repetitive pattern becomes visible to a user when the nozzles do not fire perfectly, are misdirected, mis-aligned or clogged. In this regard, as a defective nozzle sweeps across a print medium, the resulting swath will exhibit the same dot absence or misplacement for every pixel produced from the defective nozzle.

Another attempt at solving the problems associated with coalescence between diagonally adjacent pixel locations is disclosed in U.S. Pat. 4,965,593 known as the Hickman patent. The Hickman patent teaches separating the ink drop deposits in every direction, in each pass, by leaving one blank pixel in the pixel grid spacings. While this technique solves the coalescence problem associated with diagonally adjacent pixel locations, the resulting inability to print on the spaced apart pixel locations has proven to be less than desirable.

Thus, while the use of a multi-pass print mode in combination with a mask has been successful in some applications, this technique has not been entirely satisfactory. Therefore it would be highly desirable to have a new and improved printer and masking method for depositing ink droplets onto a print medium that substantially eliminates or at least that greatly reduces the depositing of indicia forming material in adjacent pixel locations while simultaneously helping to substantially eliminate or at least greatly reduce unwanted and undesired artifacts caused by the repeated application of a fixed mask matrix array.

DISCLOSURE OF INVENTION

According to a first preferred embodiment of the present invention there is provided in a multi-pass inkjet color printer having a novel method of printing which guarantees the rate of ink deposits on a pixel by pixel basis during the printing of a desired image. The novel method includes determining an ink droplet distribution pattern for a desired number of ink droplets per color per pixel over N number passes. The maximum number of ink droplets for any one pixel is constrained to Z number of drops, while the maximum number of droplets of any one ink color in any individual one of the N number of passes is limited to X number of droplets. The number X is substantially less than the number Z and equals the total number of droplets of any one-ink color divided by the N number of passes. Once the ink droplet distribution pattern is determined, each set of X number of droplets of any one ink color is randomly assigned to an individual one of the N number of passes. In short, the inventive method assures excellent print quality by evenly distributing the droplets of the different ones of the individual ink colors for each pixel over the N number of passes. This method also allows full control over which droplets are deposited on which ones of the passes to minimize the observable effects of clogging and misalignment associated with indicia depositing apparatus fatigue factors. Moreover, since the method utilizes a random dot ordering process, the normal straight-line artifacts caused by missing or misdirected nozzles tend to be disrupted and de-correlated and thus, appear less visible to the human eye.

In a second preferred embodiment of the present invention, a multipass masking system includes an ink drop control arrangement that receives and processes pixel data that is indicative of a desired number of ink droplets per color per pixel in an image to be printed. The control arrangement determines an ink drop distribution pattern for the desired number of ink droplets over N number of passes. The determined distribution pattern is constrained so the maximum number of droplets of any one ink color in any individual one of the N number of passes is limited to X number of droplets. The number X equals the total number of droplets of any one-ink color divided by the N number of passes. A sequenced pseudo-random number generator arrangement respond to the control arrangement once the distribution pattern for a given swath of image data has been determined and assign randomly each set of X number of droplets of any one ink color to individual ones of the N number of passes.

BRIEF DESCRIPTION OF DRAWINGS

The above mentioned features of the preferred embodiments of the present invention and the manner of attaining them will become apparent, and the invention itself will be best understood by reference to the following description of the embodiments of the invention in conjunction with the accompanying drawings, wherein.

DESCRIPTION OF THE PREFERRED EMBODIMENT

Figure 1:
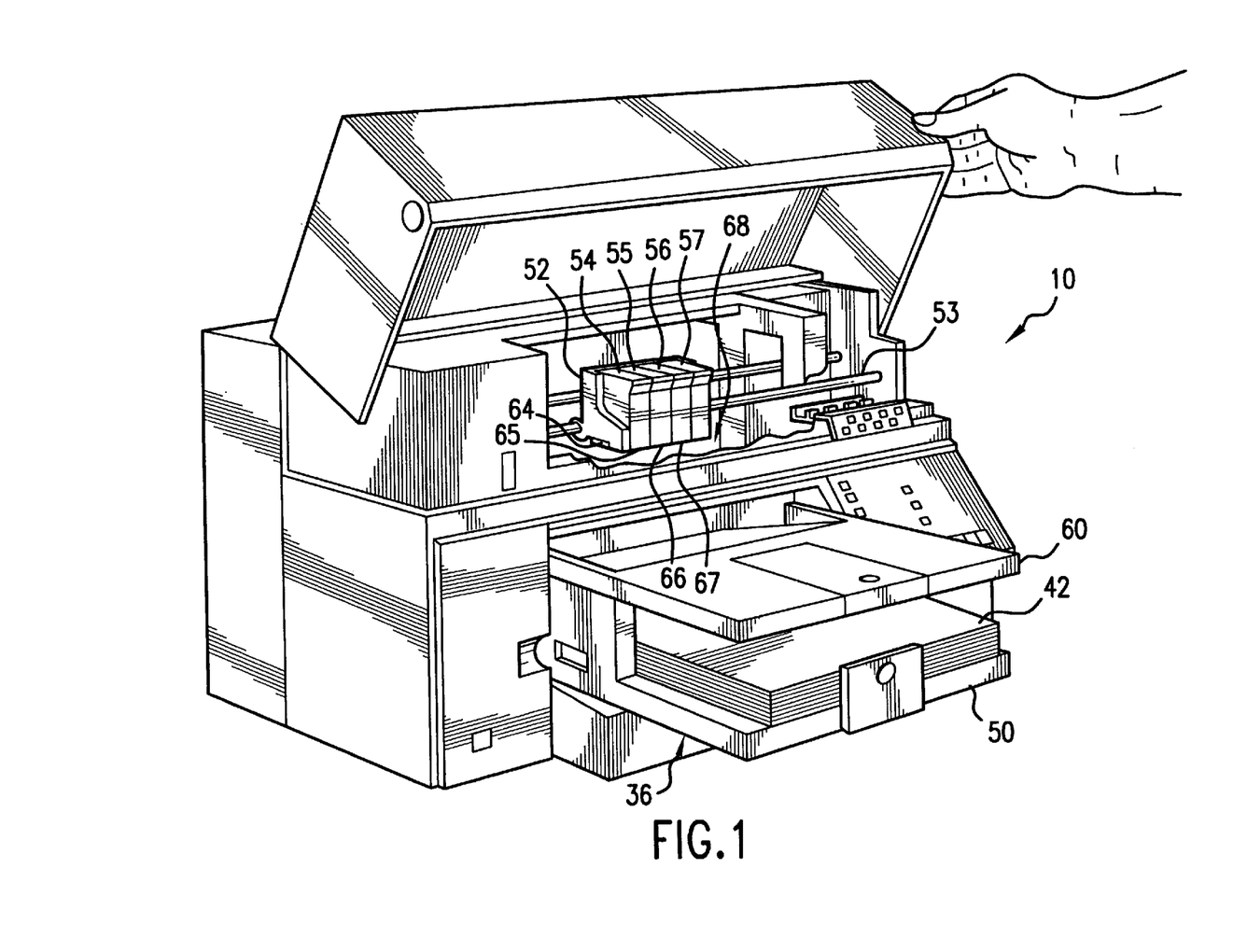
FIG. 1. is a pictorial view of an inkjet printer that is constructed in accordance with the present invention.
Figure 2:
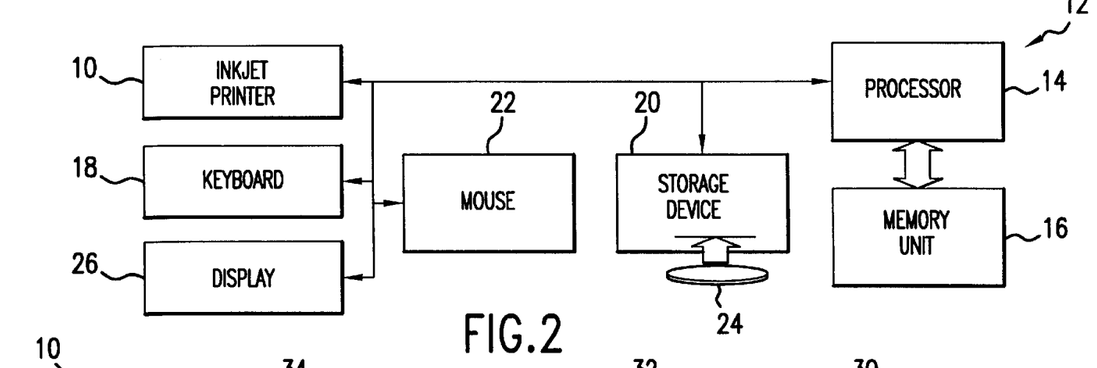
FIG. 2 is a block diagram of the inkjet printer of FIG. 1, illustrating the printer coupled to a personal computer system.
Figure 3:
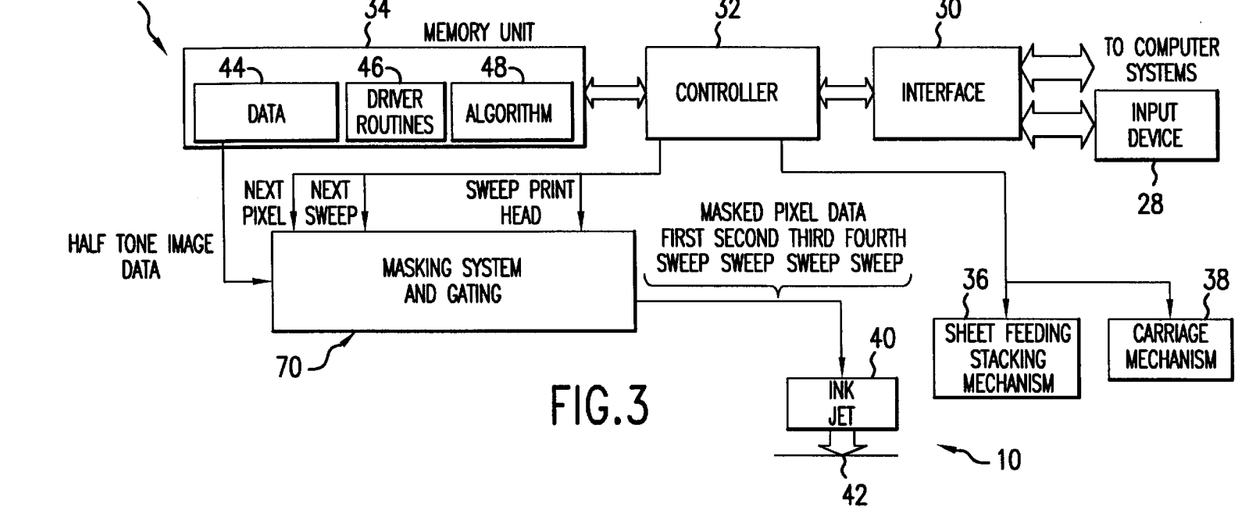
FIG. 3 is a detailed block diagram of the hardware components of the inkjet printer of FIG. 2.

According to a first embodiment of the present invention, as best seen in FIGS. 1–3, there is shown the multi-pass computer printer 10 that is constructed in accordance with the present invention. The printer 10 illustrated in FIGS. 1 and 2, is an inkjet printer which functions as a system component in a personal computer system 12. A unique characteristic of the printer 10 is the functional ability to generate an ink drop distribution pattern that allows fully even distribution of ink for each individual pixel over the number of passes used to print each of the individual pixels. Thus for example, in a 4-pass print mode printer, with an 8 ink drop constraint per pixel, no more than 2 drops of ink are ejected per pixel per pass. In a similar manner in an 8-pass printer, with an 8-ink drop constraint per pixel, no more than one drop of ink is ejected per pixel. Another unique characteristic of the printer 10 is the functional ability to randomly distribute the passes in which the ink drops of any given pixel will be printed. This technique of using randomly generated pass number to randomize the printing order of the pixel ink drops in a given swath of image data to be printed eliminates or at least greatly reduce the number of print artifacts in a printed image.

The printer 10 when coupled to the computer system 12, responds to print commands sent from a central processing unit 14 to print full color images. The printed images are stored in the form of objects or textual information in a memory unit 16 that is associated with the central processing unit 14. Alternatively, the print images may be stored on a storage media 24, such as a removable compact disc, that is received within a storage device 20 coupled to the central processing unit 14.

To facilitate a user-friendly interface for interactive operations, the computer system 12 also includes a plurality of computer peripheral devices. The computer peripheral devices include a display monitor 26 to enable a user to visualize the objects or textual information to be printed; a computer keyboard 18 that enables the user to enter information for command or information storage purposes; and a computer mouse 22 that facilitates input and output operations.

Considering now the printer 10 in greater detail with reference to FIGS. 1, 3 and 10, the printer 10 generally includes a controller 32 that is coupled to the computer system 12 via an interface unit 30. The interface unit 30 facilitates the transferring of data and command signals from the processor 14 to the controller 32 for printing purposes. As best seen in FIG. 3, the interface unit 30 also enables the printer 10 to be coupled electrically to an input device 28 for the purpose of downloading print image information to be printed on a print medium 42, such as illustrated in FIG. 3. It should be understood by those skilled in the art that the input device 28 can be any type peripheral device that can be coupled directly to the printer 10, such as for example, a digital camera, a document scanner or a compact disk drive unit.

In order to store the data received from the processor 14, storage disc 24 and input device 28, the printer 10 further includes a memory unit 34. The memory unit 34 is divided into a plurality of storage areas 44, 46, and 48 that facilitate printer operations. The storage areas include a data storage area 44 for storing the information received from the processor 14 and the input device 28. The memory unit 34 also includes a control subroutine storage area 46 that holds the algorithms that facilitate the mechanical control implementation of the various mechanical mechanisms of the printer 10. The last storage area of the memory unit 34 is a drop distribution algorithm storage area 48 that retains a control algorithm 100 that governs the rate of ink distribution per pixel per pass, as well as the evenness of ink drop coverage in the image being printed. The control algorithm 100 avoids the repeating patterns of a print mask by a random dot ordering technique that substantially avoids repeating patterns in each swath of image data printed. The control algorithm 100 will be described hereinafter in greater detail.

The data storage area 44 as previously noted, receives the data profile files that define the individual pixel values that are to be printed to form a desired object or textual image on the medium 42. The driver area 46 contains the routines that control 1) a sheet feeding stacking mechanism 36 for moving the medium 42 through the printer from a supply or feed tray 50 to an output tray 60; and 2) a carriage mechanism 38 that causes a print head carriage unit 52 to be moved across the print medium 42 on a guide rod 53.

As best seen in FIG. 1, the print head carriage unit 52 holds a set of ink cartridges 54–57 that incorporate a black ink print head 64, and a set of color ink print heads 65–67 for the colors of cyan, magenta, and yellow respectively. Each of the print heads 64–67 include a plurality of inkjet nozzles, such as a nozzle 40 (FIG. 3) for ejecting the ink droplets that form the textual and object images on a given page of information.

In operation, the high speed inkjet printer 10 responds to commands from the central processing unit 14 by printing full color or black print images on the print medium 42 which is mechanically retrieved from the feed tray 50. The feed tray 50 holds a given amount of the printing medium that varies between a single sheet, such as the sheet 42, to a predetermined maximum quantity.

The printer 10 operates in a multi-pass print mode to cause one or more swaths of ink droplets to be ejected onto the print medium 42 to form a desired image. For the purpose of clear understanding of the preferred embodiment of the present invention, the term sweep refers to one pass of the inkjet print heads over the print medium 42 in which ink droplets are fired to print dots of specific colors. A swath then, is defined as that region of the medium 42 printed on during one sweep of the print heads. A pass, is one of a multiple number of times the print heads follows their path over a specific area of the medium 42 with the opportunity to print dots. A pass may or may not involve the ejecting of droplets on the medium 42 as this depends on the information to be printed and the method in which the information is printed. Finally, a sub swath is a subdivision of a swath in which a specific pass of data is being printed. From the foregoing, it should now be understood that each swath is formed in a pattern of individual dots that are deposited at particular pixel locations in an page layout array defined for the print medium 42. The pixel locations on the print medium 42 are, therefore, conveniently visualized as being small indicia receiving areas grouped in a matrix array.

To digress for a moment, the typical inkjet printer prints a page of information by sweeping its print head pens back and forth across a sheet of print medium while ink droplets are fired from the pen nozzles. When a horizontal region or "swath" of the medium has been printed, the medium is advanced in a direction perpendicular to the pen sweep direction placing a non printed region of the medium directly below the region just printed in what is called the print zone. With the medium so positioned, the pens are then swept again to print on this new region, and the medium is advanced once again. This cycle repeats until the desired textual or graphic information has been printed on the medium.

To improve print image quality, many inkjet printer cause such pens to pass over the same region of the medium a multiple number of times, depositing droplets of ink at different ones of the pixel areas during different ones of the passes. This process is commonly called multipass printing. For example, if a four-pass print mode is implemented in such a printer, and a certain pixel of image information to be printed requires 3 drops of cyan ink, 1 drop of yellow ink, and 2 drops of magenta ink, the depositing of the required ink droplets may occur in several different orders as shown in Table I. The order in which droplets are placed on the medium can be referred to as the masking order.

TABLE I

| Example Number | Ink Droplet Color | Pass No. 1 | Pass No. 2 | Pass No. 3 | Pass No. 4 | Total No. of Drops |
|---|---|---|---|---|---|---|
| #1 | Cyan | 1 drop |  | 1 drop | 1 drop | 3 |
|  | Yellow |  | 1 drop |  |  | 1 |
|  | Magenta |  | 1 drop |  | 1 drop | 2 |
| #2 | Cyan | 1 drop | 1 drop | 1 drop |  | 3 |
|  | Yellow |  | 1 drop |  |  | 1 |
|  | Magenta |  | 1 drop | 1 drop |  | 2 |
| #3 | Cyan |  | 1 drop | 1 drop | 1 drop | 3 |
|  | Yellow |  |  |  | 1 drop | 1 |
|  | Magenta | 1 drop |  |  | 1 drop | 2 |

Referring to Table I, it can be easily seen that in each example the total number of drops of ink deposited at the pixel location is 3 drops of cyan ink, 1 drop of yellow ink, and 2 drops of magenta ink. Thus, the only difference in the three examples given is the time at which the droplets are deposited. In the past, inkjet printers have utilized what is known to those skilled in the art as a fixed mask to control the order in which the droplets are fired and deposited on the print medium.

When multipass printing is utilized, swaths are usually broken up into sub swaths that are simultaneously printing different passes of data to improve image quality. For instance, if a print head pen has a one inch height, the pen can cause a one inch tall area to be printed each time it passes over a print medium. In a 4-pass print mode of operation, the swath is divided into ¼ inch sub swaths, each sub swath being capable of receiving droplets of ink during a first pass, a second pass, a third pass or a fourth pass of the pen.

It is known to those skilled in the art that randomizing the order of when the droplets of ink are deposited can help improve image quality. Thus, with a fixed mask (non-randomized) the drop order or masking order is repeated over and over again. Such a repeating pattern many times may be observed and such observed patterns are commonly called artifacts. From the foregoing, it should be understood that randomizing can also hide the results of a defective pen nozzle as the intended droplets from the nozzle are not arrayed or arranged in a fixed noticeable pattern but instead are spread out at different times. In short, since the human eye detects repeating patterns much more easily than random ones, a randomized masking order generally produce a much higher quality image than a fixed masking arrangement.

Since randomizing has been known to improve image quality, many inkjet printers have attempted to randomize the order of drop placement. True randomization however has not been realistic since, if the masking order for a given pixel is truly randomized, data for every pass of the pens must be generated and stored at the same time before the first droplet of ink is fired for that given pixel. Stated otherwise, the random value controlling the masking of each pixel must be stored to be used on successive passes of the pens. If such data were not stored, the random value would be lost and unavailable for a calculation on future passes. Either approach (storing all passes of data or storing all random values for those passes) requires large amounts of storage due to the amount of data generated in a single sweep of the pens. As will be explained hereinafter in greater detail, the printer 10 truly randomizes the masking order without the need of large amounts of storage.

For instance, if a printhead nozzle height is one inch and a given printer is operating in a four pass print mode to provide an eight by ten inch image with a 600 dot per inch resolution, the total number of pixels in a single sweep of the printhead is calculated as follows:

Total number of pixels in a single sweep=(¼ the height of the printhead)*(the width of the medium)*(resolution)$^2$.

Total number of pixels in a single sweep= (¼)*(8inches)*(600pixels/inch)$^2$

Total number of pixels in a single sweep=720,000 pixels per pass per sweep

In view of the temporary digression into the prior art, consider the following example of a typical masking operation where a printer includes 2 print heads, each consisting of a set of 3 independent ink supplies with 64 nozzles each, spaced for a 300 dot per inch resolution. For a given medium, the system can deposit up to four drops of each ink at each pixel location with a maximum of eight total drops of ink per pixel. At the end point of color processing, the printer has a print buffer that contains 6 quantities per pixel, one for each color of ink(2 heads×3 independent ink supplies=a maximum of 6 different ink colors). These values specify the number of drops of a given ink to be deposited per pixel.

Moreover, the above-described prior art technique is incapable of controlling the amount of ink per pass per pixel. In this regard, if there are 6 chambers of ink, it is possible to put down or eject 6 drops of ink in one pass, leading to a degraded image quality. This is a local phenomenon. If the print masks are designed correctly, each print sweep will on the average put down ¼ of the drops for that region of pixels. It is on the pixel level that this average rate of ink deposition breaks down in that some pixels receive all of their drops in one or two of the four available passes. In short then, this prior art scheme does not correlate which channels of ink should be deposited at the same time.

As will be explained hereinafter in greater detail, the preferred embodiment of the present invention shares the input data format of the above- described prior art method. However, one key aspect of the present invention is that it has a different interaction model with the input data. In this regard, in the prior art methods, each input pixel is "masked" for example, four times in a four pass print mode, or eight times in an eight pass print mode. In comparison, in the present inventive technique each pixel is considered only once, and the data for each of the four print sweeps is determined at the same time.

Figure 5:
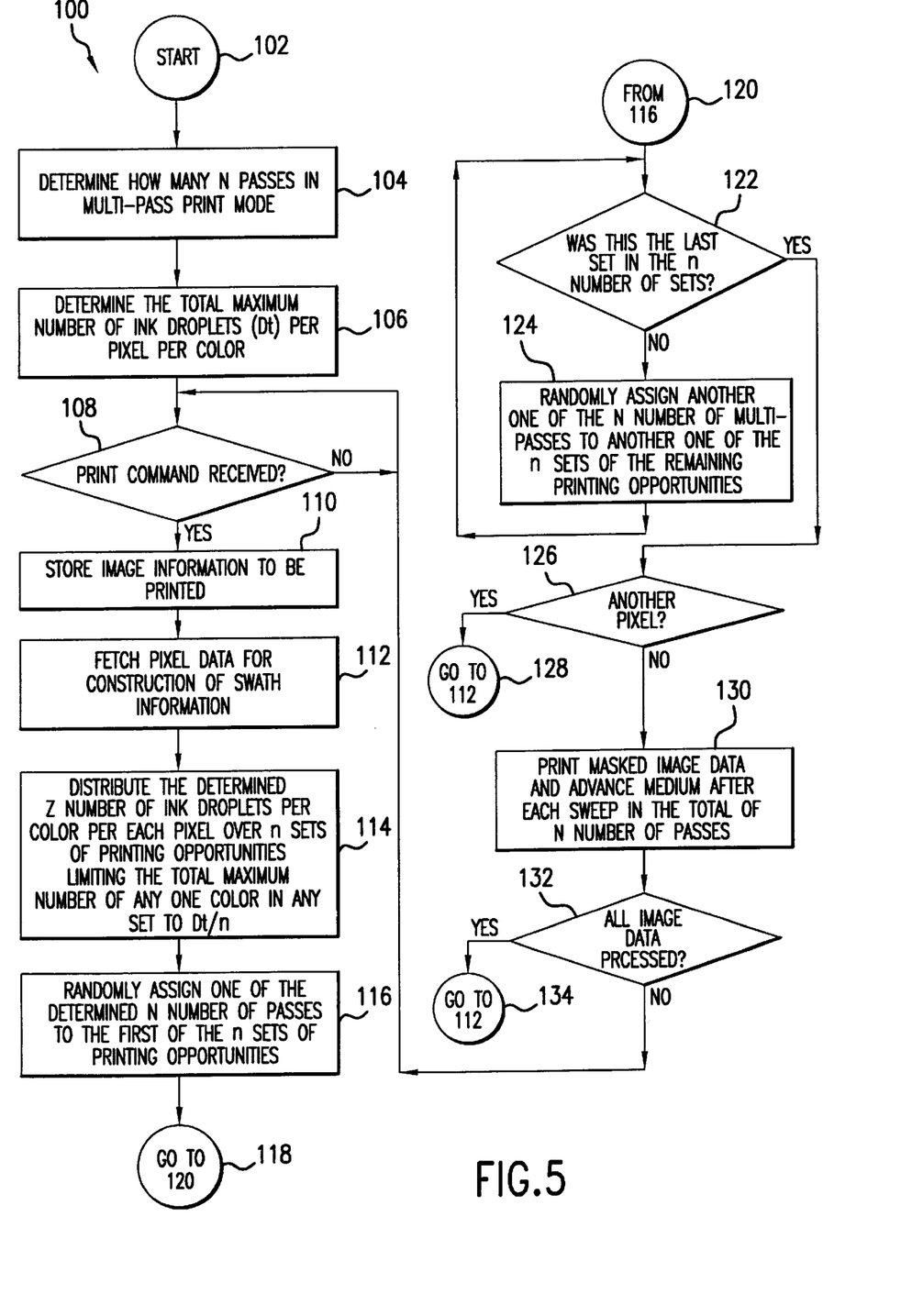
FIG. 5 is a flowchart diagram of the steps performed by the controller of the inkjet printer of FIG. 3.

Considering now the control algorithm program 100 in still greater detail with reference to FIG. 5, the algorithm 100 begins at a start command 102 when power is applied to the controller 32. The program then proceeds to a determination command 104 that determines whether the printer system is a 4-pass printer or an 8-pass printer. The program then goes to another determination command 106 to determine the maximum number of droplets of ink that can be deposited at any given pixel location in an image to be printed. The maximum number of droplets per pixel depends upon the type of printing operations to be performed by the system. For example in a photo printing operation the maximum number of drops per pixel is 8 drops.

From the determination step 106, the program then advances to a decision command 108 to wait for a print command from the processor 14. In this regard, if no print command is received, the controller 32 loops at the decision step 108 until the print command is received.

When the print command is received, the program executes a store command 110 to cause the image information received from the processor 14 to be stored in the data area 44 of the memory unit 34. Next the program advances to a command instruction 112 that causes the controller 32 to fetch the stored image data on a pixel by pixel basis in order to construct a swath of data to be printed. Each input pixel is retrieved only once to convert its color space values to a half tone value of the printer 10.

The conversion process for translating from one color space to the half tone color space of the printer 10 results in determination of the number of ink droplets of one or more colors that must be ejected at each pixel location in the image to be printed. The maximum number of droplets at each pixel location is a predetermined number Z that is determined by the number of different ink colorants available for printing purposes and the type of printing tasks that will be performed by the printer 10. In this regard, Z can be between about 4 drops and about 16 drops. A more preferred value for Z is between about 6 drops and about 12 drops, while the most preferred value for Z is about 8 drops.

The value of Z as mentioned earlier is a predetermined value. The predetermined value of Z imposes a first constraint in the control program 100 relative to providing for an even deposition of ink over time per pixel. For example to provide for an even rate disposition over time per pixel in a 4-pass mode of operation, where Z is equal to 8 drops, no more than two drops of ink can be ejected per pixel per pass. As another example, in an 8-pass mode of operation, where Z is equal to 8 drops, no more than one drop of ink can be ejected per pixel per pass.

After the color space translation is performed at step 112 for a current pixel, the control program 100, at a command step 114, causes the controller 32 to distribute the determined number of droplets per color per pixel over N sets of printing opportunities while limiting the total maximum number of any one ink colorant in any set to X number of drops. The value of X is determined by the following:

Maximum number of drops per pixel=Z number of drops=8

Number of passes employed by the multi-pass printer=N number of passes=4

Maximum number of drops per pixel per pass=X drops per pass per pixel for even rate distribution=2 since:

Z/N=2

Once the ink droplet distribution for each ink colorant has been determined and assigned, the program proceeds to a command step 116 that assigns randomly one of the N number of pass numbers ($1^{st}$ pass, $2^{nd}$ pass, $3^{rd}$ pass, $4^{th}$ pass, and so forth depending on the value of N) in which ink disposition will occur for the first drop set of the pixel.

After the first drop set of the pixel has been assigned randomly one of the N number of pass numbers, the program proceeds to a decision command 122 to determine whether the drop set was the last set in the n number of drop sets. If the drop set was not the last set, the program advances to a command instruction 124 that randomly assigns the next drop set to another one of N number of pass numbers causing the information to be stored for subsequent printing. The program then returns to the decision instruction 122 and proceeds as described previously until all of the drop sets in the pixel have been stored and assigned randomly to the individual ones of the N number of pass numbers.

If a determination is made at the decision instruction 122 that all ink drop sets in the current pixel have been assigned to one of the N number of passes, the program proceeds to a decision instruction 126 to determine whether any additional pixels in the current swath of data need to be converted and assigned to passes numbers. In this regard, if additional pixels in the current swath need to translated, assigned to drop sets and pass numbers, the programs returns to command 112 via a go to command 128.

If all image data for the current swath has been translated, assigned a pass number and stored, the swath of information is ready to be printed. In this regard, the program advances from the decision instruction 126 to a command instruction 130 that causes the controller 32 to execute a sweep printhead 52 and eject the different ones of the color ink droplets as assigned to the individual ones of the sweeps while advancing the medium after each sweep in the total N number of sweeps. While the controller 32 is causing the print head to sweep and form the first swath of printed information on the print medium 42, the program advances to a decision command 132 to determine whether any additional swaths of data need to be constructed and printed.

If at the decision instruction 132 a determination is made that additional swaths need to be constructed and printed, the program returns to command 112 via a go to command 134 to fetch additional pixel data to construct another swath of information. If all image data has been processed, the program proceeds the decision instruction 108 to wait for another print command from the processor 14.

From the foregoing, it should be understood by those skilled in the art that after each pixel is assigned a sweep or pass number, it is copied to the correct location within that sweep so that as soon as the requisite number of rows of pixels are processed for each swath, the buffered data is printed and the buffer is cleared to receive another set of image data for printing another swath.

Figure 6:
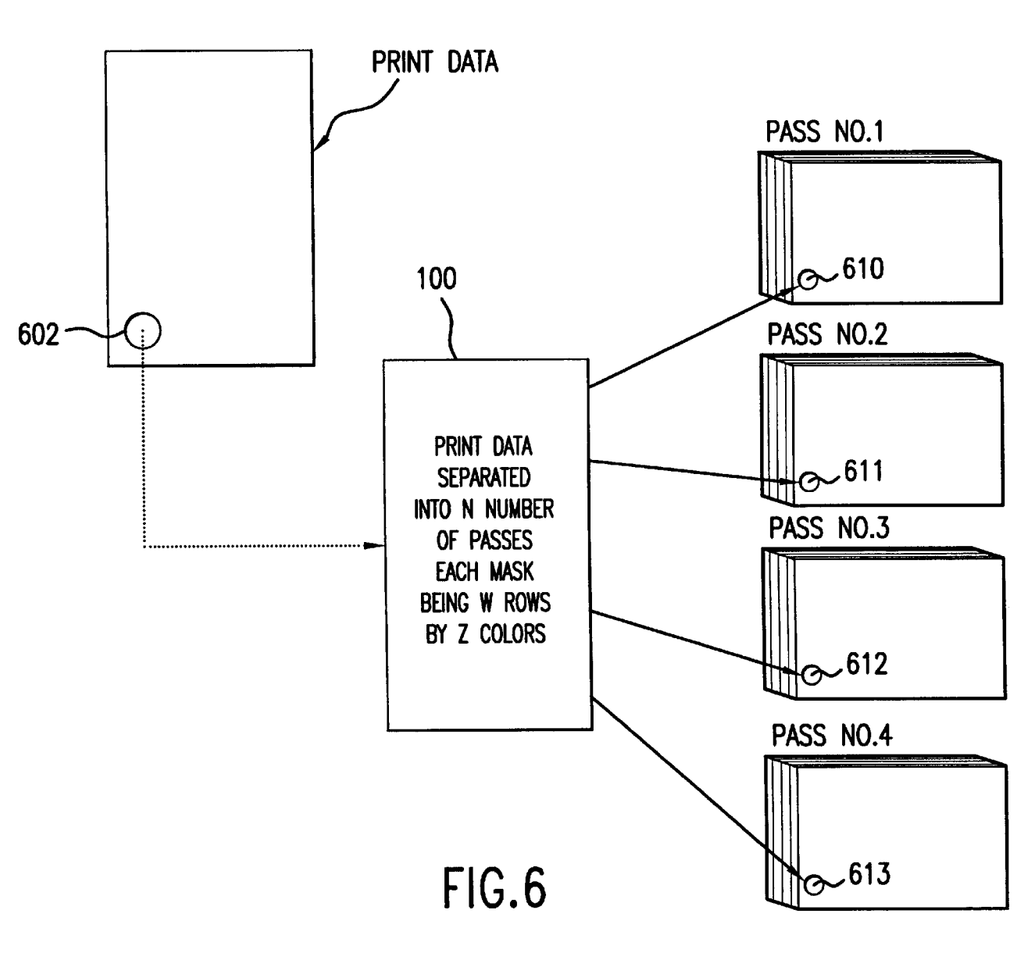
FIG. 6 is a general diagrammatic illustration of steps performed by the controller of the inkjet printer of FIG. 3.

Considering the novel rate limited shuffler technique in still greater detail with reference to FIGS. 6–9, a fetched pixel 602 defined by a certain number of colorant ink drops is shown in a diagrammatic representation illustrated in FIG. 6. The control program 100 allocates the drops of ink necessary to form the pixel 602 in a plurality of different sets. The control program then assigns the n number of sets of ink drops randomly within the N number of passes, as indicated generally at 610–613. Each set is composed of 6 color planes each plane being arranged in a 16×64 array.

Figure 7:
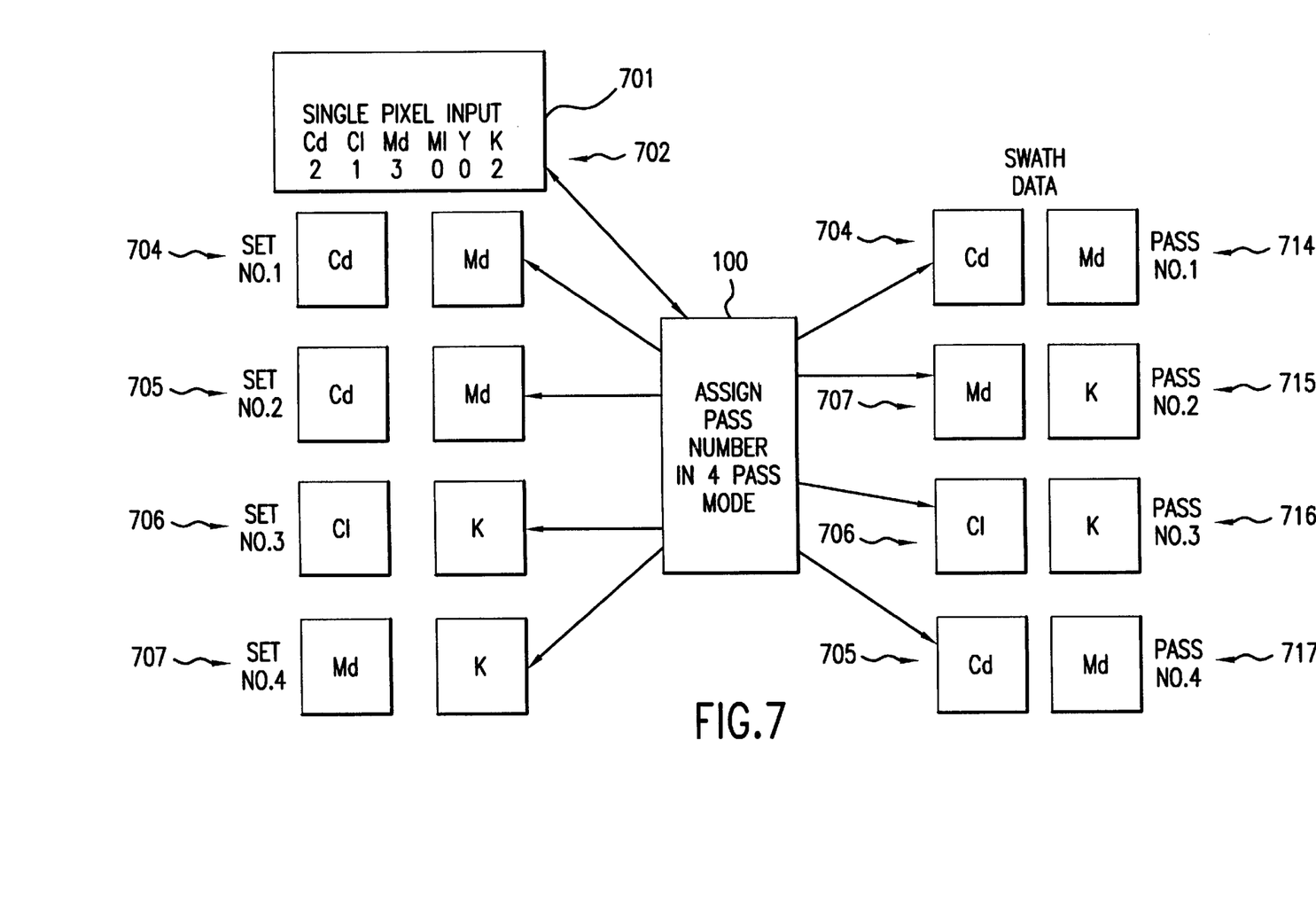
FIG. 7 is an illustrative diagrammatic representation of pixel processing in a four-pass inkjet printer.

FIG. 7 illustrates the rate limited shuffler technique applied to print data 701 having a single pixel input 702. The pixel 702 will be form using 2 drops of dark cyan ink, 1 drop of light cyan ink, 3 drops of dark magenta ink, and 2 drops of black ink in a 6 colorant 4 pass printer system. The control program 100 determines that no more than two drops of ink per pixel per pass can be ejected and establishes 4 sets of 2 ink drop assignments indicated generally at 704–707.

Utilizing this determined information, the control program 100 assign two drops of each of the required inks to each of the two drop sets 704–707 respectively. In this example, in the first set 704, the program 100 assigns one drop of dark cyan and one drop of dark magenta; in the second set 705, one drop of dark cyan and one drop of dark magenta; in the third set 706, one drop of light cyan and one drop of black; and in the fourth set 707, one drop of dark magenta and one drop of black for a total maximum Z number of drops, where Z is equal to 8. The program 100 also insures that no more than X or 2 drops of the same colorant ink are assigned in any one of the four sets 704–707 respectively.

After assigning the ink drops to the respective sets 704–707, the program 100 next causes the assigned sets 704–707 to be assigned randomly for printing to individual ones of the N pass printing opportunities indicated generally at 714–717. In this regard, the program 100 causes the first set 704 to be assigned to the $1^{st}$ pass 714; the second set 705 to be assigned to the $4^{th}$ pass 717; the third set 706 to be assigned to $3^{rd}$ pass 716; and the fourth set 707 to be assigned to the $2^{nd}$ pass 705.

Figure 8:
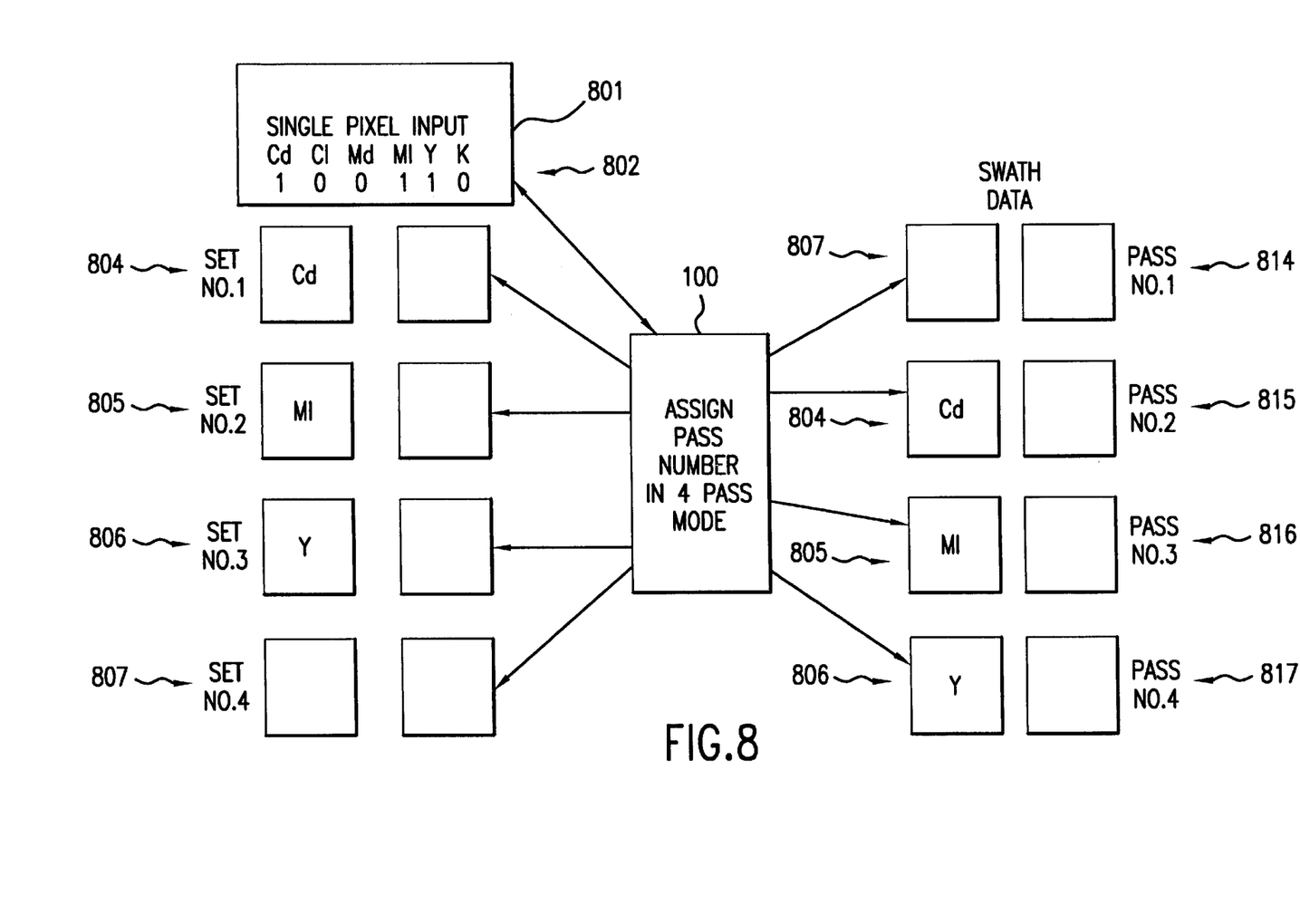
FIG. 8 is another illustrative diagrammatic representation of pixel processing in the four-pass inkjet printer.

FIG. 8 provides another example of a 4-pass mode single pixel process where a single pixel 801 is composed of one drop of dark cyan, one drop of light magenta, and one drop of yellow in an eight drop maximum system. The control program 100 in this example establishes 4 two-drop sets 804–807 and assigns randomly the required drops to individual ones of the sets 804–807. More particularly, the control program 100 assigns the dark cyan drop to the first set 804, the light magenta drop to the second set 805 and the yellow drop to the third set 806. This random assignment leaves the fourth set 807 without any drop assignments and sets 804–806 with only one-drop assignment.

The control program 100 then assigns randomly the individual sets 804–807 to individual ones of the four passes indicated generally at 814–817. In this example, the first set 804 is assigned to the $2^{nd}$ pass 815; the second set 805 is assigned to the $3^{rd}$ pass 816; the third set 806 is assigned to the $4^{th}$ pass 817; and the fourth set 807 is assigned to the $1^{st}$ pass 814.

From the foregoing it should be understood by those skilled in the art that the control program 100 provides full control over which droplets of ink are printed on which pass. Variations in the control programs randomizing include deciding which colorant inks to pair together when two drops are being printed per pixel and determining where to insert non printing opportunities or blanks.

Because of the randomizing of print passes, the control program generates non repeating patterns that which avoid the artifact problems associated with fixed mask patterns in traditional print masking. Moreover, since the method uses a random dot ordering process, the normal straight-line artifacts caused by missing or misdirected nozzles tend to get de-correlated and appear less visible. Finally artifacts caused by print mechanism advance errors and velocity variation of carriage travel tend to be disrupted by the unique rate limited shuffler as provided by the present invention.

Figure 9:
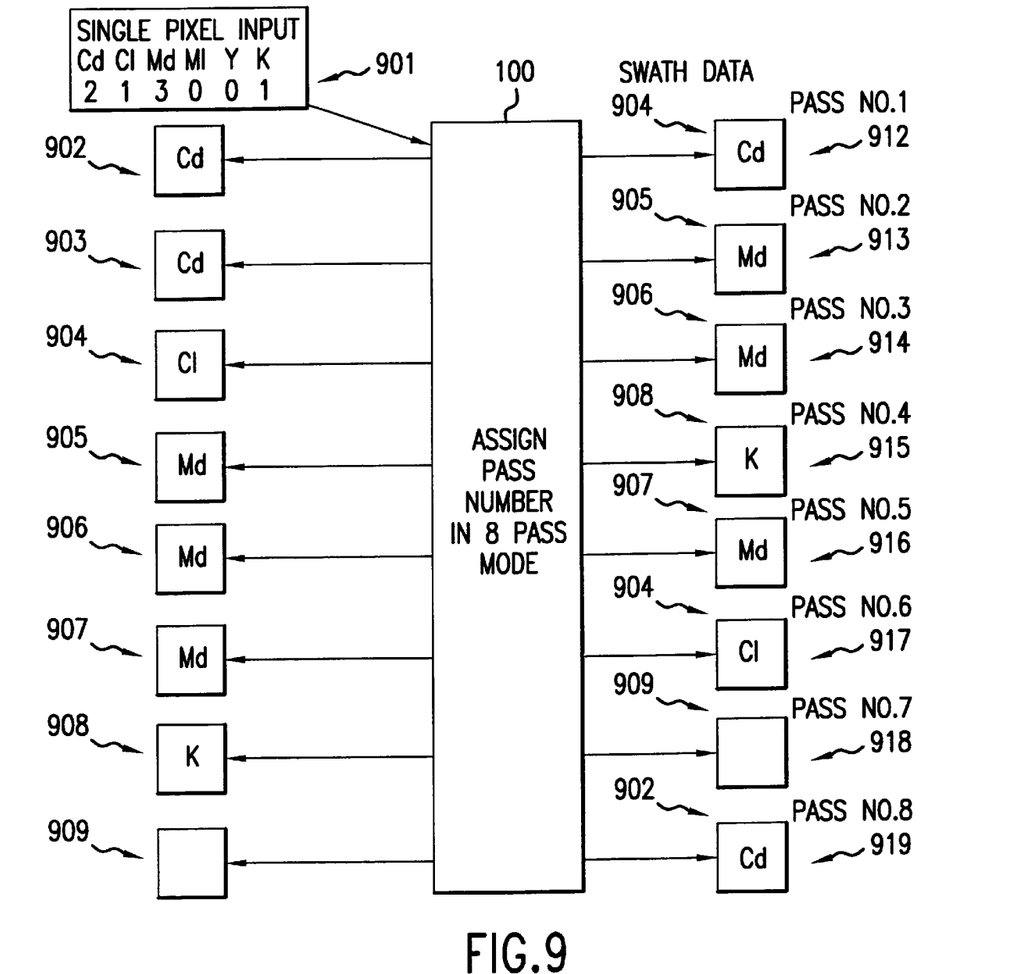
FIG. 9 is an illustrative diagrammatic representation of pixel processing in an eight-pass inkjet printer.

In FIG. 9 a diagrammatic illustration of an 8-pass print mode is shown. In this example, the control program 100 processes a single pixel 901 having 2 drops of dark cyan, 1 drop of light cyan, 3 drops of dark magenta, and 1 drop of black in an 8 drop maximum system. Since this embodiment is an 8-pass printer, the maximum number of drops per pixel per pass is one drop. Accordingly, the drops are assigned to individual ones of eight printing opportunities indicated generally at 902–909. The control program 100 then assigns randomly the drops to individual ones of the passes indicated generally at 912–919. Thus, in this example 902 is assigned to the $8^{th}$ pass 919; 903 is assigned to the $1^{st}$ pass 912; 904 is assigned to the $6^{th}$ pass 917; 905 is assigned to the $2^{nd}$ pass 913; 906 is assigned to the $3^{rd}$ pass 914; 907 is assigned to the $5^{th}$ pass 916; 908 is assigned to the $4^{th}$ pass; and 909 is assigned to the $7^{th}$ pass 918.

After each pass of the printhead 52, the control program 100 causes the printing medium 42 to be advanced incrementally in preparation for printing the next portion of image information. After each swath of information is printed, the control program 100 proceeds to a determination step 132 to determine whether additional image information is to be printed. If additional image information is to be printed, the program goes to the command step 112 via the go to command step 134 and proceeds as described previously. If no additional image information is to be printed, the program advances to the determination step 108 and waits for the next print command to be received.

It should be understood by those skilled in the art that each pixel in the image to be printed is only considered once so the data for each of the four print passes or sweeps is determined at the same time. Stated otherwise, when the drop requirements of a pixel are allocated or distributed to provide even deposition of ink over time there is only a one allocation. This is unique, as in older methods, each input pixel is "masked" four times in a 4-pass pass system and eight times in an 8-pass system. In short then, each time the program executes steps 112–124 a unique sequence of the randomly arranged individual pixel masking values is repetitively applied over the four passes to the image data to be printed.

Although a different sequence of masking values is applied every four passes, it should be understood by those skilled in the art that the same masking values is applied for each pass in each swath to be printed. Thus for example, in a four pass print mode, a unique set of individual pixel masking values is applied in each pass of each four pass sequence. In this manner, the same masking values are uniformly applied on a swath by swath basis to the image information to be printed. In short then, the total number of individual pixel masking values that are applied in the formation of the desired image to be printed is determined by the total number of passes that will be made to form the image, the height of the printhead nozzle configuration, and the printing resolution. There is no intention therefore to limit the scope of the number of masking values applied to any fixed number.

Considering now the preferred embodiment of the present invention in still greater detail with reference to FIG. 4, in a generalized sense in an N-pass print mode system, the pens in the printhead 52 pass over each pixel on the print medium N times. Thus for any given pixel in a current swath, a selected number of droplets will be deposited relative to each pass over such a given pixel. On the last pass of the swath, or the N pass, any remaining droplets of ink to be deposited at the given pixel location will be placed so that all drops required to represent the desired pixel color will have been deposited.

In order to implement the random assignment of pass numbers to the drop assignment established by the control program 100, the printer 10 further includes a masking system 90. The implementation of the masking system 90 will not be described hereinafter in greater detail as one skilled in the art can easily configured the necessary timing and gating controls to accomplish the necessary masking under the control of the control program 100. For example, one type of implementation is illustrated in U.S. patent application Ser. No. 09/070,550, entitled "A Multi-Pass Psuedo Random Masking System and Method of Using Same," now U.S. Pat. No. 6,124,946, issued on Sep. 26, 2000

FIGS. 4A–4D are diagrammatic illustrations of a multi-pass print mode of operation, wherein a swath on a print medium 602 is defined as an indicia deposit area covered during one sweep of the inkjet print head 604. The indicia deposit area in the preferred embodiment of the present invention has a width that corresponds to the image width and a height defined by the height of the total number of nozzles in the print head 604, without loss of generality.

Thus, if a four-pass print mode is assumed as illustrated in FIGS. 4A–4D, the indicia deposit area includes an area 640, an area 642, an area 644 and an area 646 that are covered with indicia forming material during one sweep of the print head 604. As will be explained hereinafter in greater detail, the indicia deposit areas 640, 642, 644 and 646 receive indicia forming material from one or more of the four groups of print head nozzles indicated generally at 650, 652, 654 and 656, respectively.

Figures 4A, 4B, 4C, 4D:
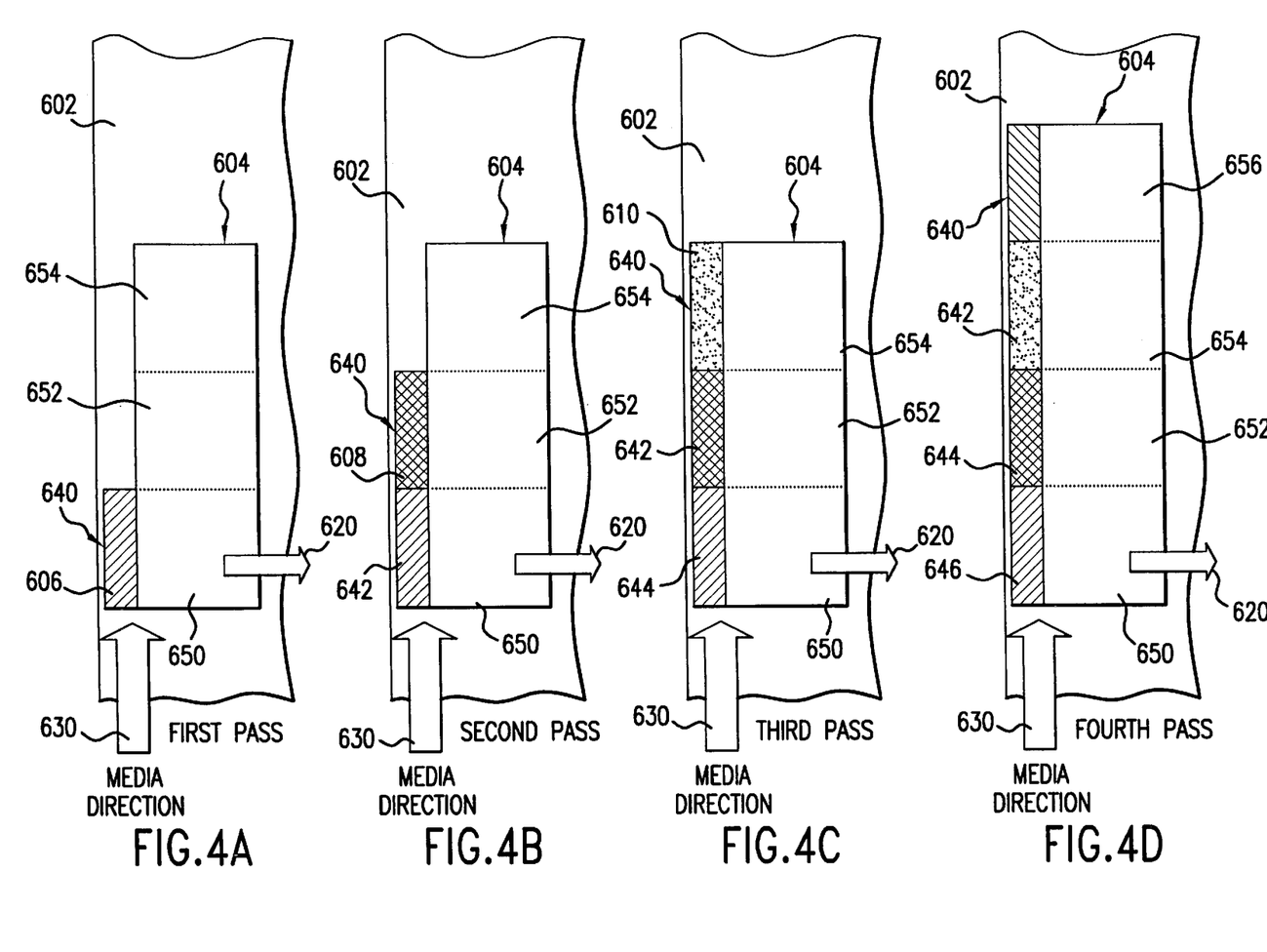
FIGS. 4A–D are diagrammatic illustrations of forming a swath of image information on a printing medium in a four pass print mode.

Referring now to the indicia deposit area 640, the illustration of FIGS. 4A–4D are examples applicable to the complete image. Area 640 has a width that corresponds to the width M of the complete image and a height that corresponds to one-fourth of the height of the height dimension covering the inkjet nozzles of the print head 604. As best seen in FIG. 4A, as the print head 604 traverses above the medium 602, the print head 604 travels along a sweep path indicated generally at 620. As the print head 604 traverses along the sweep path 620 during a first pass, the nozzles in-group 650 eject drops of indicia forming material onto the medium 602. The density of the ink droplets deposited on the print medium 602 in the indicia deposit area 640 during the first pass is indicated generally at 606. When the print head 604 reaches the end of the sweep path 620, the medium 602 is advanced an incremental step along a medium path of travel indicated generally at 630. In this regard, that part of the medium corresponding to the indicia deposit area 640, is advanced to be in alignment with the inkjet nozzles in group 652, as best seen in FIG. 4B.

Referring now to FIG. 4B, as the print head 604 again traverses above the medium 602 during a second pass along the sweep path 620, the nozzles in group 652 eject drops of indicia forming material onto the medium 602 in the indicia deposit area 640. As a result of depositing additional ink droplets during the second pass, there is an increase in the density of ink droplets in the indicia deposit area 640, which is indicated generally at 608 as a darker shade. When the print head 604 reaches the end of the sweep path 620 during the second pass, the medium 602 is advanced incrementally once again so that the indicia deposit area 640 is advanced to be in alignment with the inkjet nozzles in group 654, as best seen in FIG. 4C.

Referring now to FIG. 4C, a third pass of the print head 604 along the sweep path 620 is illustrated. During the third pass, the nozzles in group 654 eject drops of indicia forming material onto the medium 602 in the indicia deposit area 640. The deposit of additional ink droplets again increases the density of the ink droplets in area 640, which is indicated generally at 610 as a yet darker shade. When the print head 604 reaches the end of the sweep path 620 during the third pass, the medium 602 is advanced incrementally once again so the indicia deposit area 640 is advanced to be in alignment with the inkjet nozzles in group 656, as best seen in FIG. 4D.

Referring now to FIG. 4D, a fourth pass of the print head 604 along the sweep path 620 is illustrated. During the fourth pass, the nozzles in group 656 eject drops of indicia forming material onto the medium 602 in the indicia deposit area 640. The deposit of additional ink droplets further increase the density of the ink droplets in area 640, which is indicated generally at 612 as a darkest shade. When the print head 604 reaches the end of the sweep path 620 during the fourth pass, the medium is advanced incrementally once again. From the foregoing, those skilled in the art will understand the darkest shade results from the indicia deposit area 640 receiving ink droplets during each of the four passes in the illustrative four pass print mode operation.

Referring again to FIGS. 4A–4D, it can be seen that the image information in area 640 is divided into four groups and printed over four passes by the respective ones of the inkjet nozzles 650, 652 and 654. Although the illustrative example has concentrated on the indicia deposit area 640, the other portions of the swath cover other areas similar to that area indicated at 640. These other areas, through proper media advances and inkjet nozzle ejections during sweeps of the print head 604 along the sweep path 620, are in a similar manner, covered with ink droplets during each of the four passes, except for margin areas when the print head nozzles are disposed at the top or bottom of the image, to constitute a four pass print mode of operation. More specifically, in FIGS. 4B and 4D, the area 642 receives indicia forming material from the nozzles in group 650 during a first pass and indicia forming material from the nozzles in group 652 during a second pass, and indicia forming material from the nozzles in group 654 during a third pass. In a similar manner, the area 644 receives indicia forming material from the nozzles in group 650 during the above-mentioned second pass, and indicia forming material from the nozzles in group 652 during the above-mentioned third pass. Finally, the area 646 receives indicia forming material from the nozzles in group 650 during the above-mentioned third pass.

Considering now the carriage unit 52 in greater detail with reference to FIG. 1, the carriage unit 52 supports and carries a set of removably mounted print cartridges, such as the print cartridges 54–57. The carriage 52 is supported from below on a slide rod 53 that permits the carriage 52 to move under the directing force of the carriage mechanism 38 along a rectilinear path of travel, such as the sweep path 620 illustrated in FIGS. 4A–D.

As best seen in FIG. 1, the path of travel followed by the print carriage 52 is traverse to the path of travel followed by the sheet 42 as it passes through a print zone, indicated generally at 68. In this regard, when a print operation is initiated by the print controller 32, in response to a print command from the processor 14, the sheet feed stacking mechanism 36 causes the sheet 42 to be moved from the supply tray 50 along a medium path of travel, such as path 630, as illustrated in FIGS. 4A–D, and into the print zone 68, where the sheet 42 is stopped temporarily for printing purposes. When the sheet 42 stops along its path of travel, the carriage mechanism 38 causes the carriage 52 to scan across the sheet 42 a predetermined number of times, such as Z number of times. The Z number allows one or more print heads, such as the print heads 64–67, to eject drops of ink via associated ones of their nozzles. The ejection of the ink droplets at appropriate times onto the medium 42 and in desired patterns is controlled by the print controller 32, wherein the timing of the application of the ink droplets onto the sheet 42 correspond to the pattern of image pixels being printed. The Z number of times the carriage 52 travels across the print medium 42 is between 2 time and 16 times depending on the ink drop density deposited on the medium 42.

In one mode of operation, the controller 32 causes a stepper motor and an associated set of feed rollers (not shown) forming part of the sheet feeding stacking mechanism 36 to be actuated at the end of each pass causing the sheet 42 to be incrementally shifted or moved along its path of travel to a next printing position within the print zone 68.

When the sheet 42 comes to rest at the next position in the print zone 68, the carriage 52 is scanned across the sheet 42 for printing another portion of the image information. When the sheet 42 has been advanced through each of its printing positions in the print zone 68 so that printing of the desired information is completed, the sheet 42 is moved out from the print zone 68 into the output tray 60.

Considering now the operation of the inkjet printer 10 in greater detail with reference to FIGS. 1–3 and 4 A–B, under the command of a user, the processor 14 assembles a predetermined quantity of data that is indicative of an object or document to be printed on the printing medium 42. In order to produce a hard copy of the object or document to be printed, the processor 14 sends the predetermined quantity of data to the inkjet printer 10. The inkjet printer 10 in turn, temporarily stores the data received from the processor 14 and then retrieves the data causing it to be printed or recorded on the medium 42 in the form of a plurality of ink droplets which are rapidly ejected from the print head nozzles, as the carriage 52 traverses in a reciprocating rectilinear path of travel across the medium 42.

While the controller 32 is causing the data to be printed to be temporarily stored in the data area 44 of the memory unit 34, the controller 32 is simultaneously randomly generating a seed value for initiating a masking sequence via the masking system 90. In this regard, the algorithm 100 causes the controller 32 to apply the individual masks on a pixel by pixel basis to the image information to be printed. The mask application allows the image information to be separated into and then covered by n passes, thus minimizing the printing of adjacent pixels and effectively reducing the visible effects of poor nozzle performance. The individual pixel masks thus facilitates printing in a multi-pass mode and significantly reduces artifacts.

As best seen in FIGS. 4A–4D, the resulting four pass print mode swath is formed by the ejection of ink droplets from the four respective groups of nozzles 650, 652, 654 and 656 of the print head 604. The area indicated by 640, over the four passes, is covered by each of the four groups of nozzles 650, 652 654 and 656 successively. The image information deposited in area 640 is separated into passes to minimize artifacts and to complete the total image information in area 640. A random set of pixel masking values is applied to the image data in area 640 and the resulting information is printed by nozzle group 650 as illustrated in FIG. 4A. After the medium advances, a second random set of pixel masking values sequenced in the same masking order as the first set of masking values is applied to the image data in area 640, and the result is printed by the nozzle group 652. After a third advance of the medium 602, and application of a third set of pixel masking values, the information is printed by the nozzle group 654. Finally after a fourth advance of the medium 602, and the application of a fourth set of pixel masking values, the information is printed by the nozzle group 656. In this manner, the image information in area 640 is divided by the four sets of individual pixel masking values and completely printed in the four passes. For those skilled in the art, it should be clear that the nozzles groups 654 and 656 in FIG. 4A, are ejecting ink droplets relative to third and fourth passes over other areas similar to area 640, respectively. Similar situations occur relative to FIGS. 4B, 4C and 4D.

Although each indicia receiving area, such as area 640, is governed by one repetitive set of individual pixel masking values, it is important to note that the pattern within each repetitive set does not repeat small ordered patterns, such as occurs when small 2×2 or 4×4 mask matrix arrays are applied. It is also important to note that another repetitive sets of individual pixel masking values are generated relative to each of the other indicia receiving areas. Thus, adjacent areas relative to the area 640 do not use the exact same masking values for their indicia receiving areas. It is also beneficial that the individual pixel masking values are divided or structured in a large matrix array that corresponds to substantially the width of the of the medium and one quarter the height of the nozzle configuration of the print head 604. From the foregoing, it should be understood by those skilled in the art, that each adjacent area such as that in area 640, utilizes another set of repetitive pixel masking values and thus, limits the repeating pattern over the printed image.

Considering now the control algorithm 100 in greater detail with reference to FIG. 7, the number of individual pixel masking values that are applied via the algorithm 100, to any given area of image data is dependent upon the number of passes employed in a multi-pass print mode and the number of printheads. For example, for a single printhead printer operating in a two-pass print mode, two sets of repetitive individual masking values are required. On the other hand, for a four printer head printer operating in a four-pass print mode, four sets of repetitive masking values are required for each printhead, for a total of 16 sets of repetitive individual pixel masking values.

From the foregoing, it should be understood by those skilled in the art that the key point is that for any pen the masking pattern should appear to be random for each sweep.

For purposes of illustration then, the following description relates to a single multi-color printhead, and is only one of many configurations relating to a preferred embodiment of the present invention. Therefore, in a four-pass print mode, there are four individual repetitive sets of individual pixel masking values applied to the image data to be printed. The repetitive set of pixel masking values are randomly arranged in a set of X numbers, where X is substantially greater than the total number of pixels in an indicia receiving area relative to one sweep of the printhead 604.

While a particular embodiment of the present invention has been disclosed, it is to be understood that various different modifications are possible and are contemplated within the true spirit and scope of the appended claims. There is no intention, therefore, of limitations to the exact abstract or disclosure herein presented.

I claim:

1. A masking method comprising the steps of:
    determining a total number of droplets of each colorant ink in a plurality of different colorant inks to be deposited at a given pixel location;
    determining once for said total number of droplets of each colorant ink to be deposited at said given pixel location in a substantially even rate ink droplet distribution for each colorant ink to be deposited over N number of passes available in an inkjet color printer; and
    assigning an individual one of the N number of passes to each individual colorant ink droplet to be deposited at said given pixel location to effect said substantially even drop distribution at said given pixel location.

2. A masking method according to claim 1, further comprising the steps of:
    receiving pixel data indicative of a desired number of ink droplets for another pixel in an image to be printed; and
    repeating the steps of the first mentioned determining, the second mentioned determining, assigning, and receiving a sufficient number of times to form the desired pixels on a print medium.

3. A masking method according to claim 1, wherein said step of assigning includes randomly assigning the N number of passes to each individual colorant ink droplet to be deposited.

4. A masking method according to claim 1, further comprising the steps of:
    determining pairs of different color inks when two droplets of different ink colorants are being deposited in any one of the N number of passes.

5. A masking method according to claim 1, further comprising the steps of:
    determining during which ones of the N number of passes that no droplets of ink will be deposited.

6. A masking method according to claim 1, wherein the plurality of different colorant inks is three different colorant inks.

7. A masking method according to claim 1, wherein the plurality of different colorant inks is six different colorant inks.

8. A masking method comprising the steps of:
    determining a total number of droplets of each colorant ink in the plurality of different colorant inks to be deposited at a given pixel location;
    determining once for said total number of droplets of each colorant ink to be deposited at said given pixel location in a substantially even rate ink droplet distribution for each colorant ink to be deposited over N number of passes available in an inkjet color printer;
    assigning an individual one of the N number of passes to each individual colorant ink droplet to be deposited at said given pixel location to effect said substantially even drop distribution at said given pixel location;
    limiting the number of droplets of colorant ink to be deposited at said given pixel location to a maximum number of droplets; and
    limiting the maximum number of droplets of any one ink colorant in any one of the N number of passes to X number of droplets, where X equal the first mentioned maximum number of droplets to be deposited at said given pixel location divided by the N number of passes.

9. A masking method according to claim 8, wherein X is equal to 1 droplet of ink when N is equal to 8 passes.

10. A masking method according to claim 9, wherein X is equal to 2 droplets of ink when N is equal to 4 passes.

11. A masking method according to claim 10, wherein the first mentioned step of limiting includes;
    determining a type of print medium for depositing the ink droplets.

12. A masking method comprising the steps of:
    receiving pixel data indicative of a desired number of ink droplets per color per pixel in an image to be printed;
    determining an ink droplet distribution pattern for said desired number of ink droplets over N number of ink droplet depositing opportunities;
    said distribution pattern limiting the maximum number of droplets of any one ink color to at least one droplet of ink in each of the N number of ink droplet depositing opportunities; and
    assigning each ink droplet of the determined distribution to an individual one of the N number of depositing opportunities.

13. A masking method according to claim 12, wherein said distribution pattern is an even distribution pattern so that the maximum number of ink droplets per color per pixel is limited to a fixed number Y of droplets over the N number of depositing opportunities.

14. A masking method according to claim 12, wherein said distribution pattern further limits the maximum number of ink droplets per pixel to 8 drops.

15. A masking method according to claim 14, wherein when N is equal to 8, Y is equal to 1.

16. A masking method according to claim 15, wherein the total maximum number of ink droplets per pixel per depositing opportunity is 2.

17. A masking method according to claim 12, wherein said distribution pattern further limits the maximum number of ink droplets per pixel to 4 drops.

18. A masking method according to claim 12, wherein when N is equal to 4, Y is equal to 2.

19. A masking method according to claim 18, wherein the total maximum number of ink droplets per pixel per depositing opportunity is 1.

20. A masking method according to claim 12, wherein said step of assigning is a random assignment to any one of the N number of depositing opportunities.

21. A masking method according to claim 12, wherein said step of assigning includes:
providing a random number generator to generate non repeating patterns to use in selecting individual ones of the N number of depositing opportunities.

22. A masking method according to claim 12, further comprising the steps of:
providing Z number of different color inks.

23. A masking method according to claim 22, further comprising the steps of:
determining pairs of different color inks when two droplets of different color ink are being deposited in any one of the N number of depositing opportunities.

24. A masking method according to claim 12, further comprising the steps of:
determining during which ones of the N number of depositing opportunities that no droplets of ink will be deposited.

25. A multi-pass masking system, comprising:

an ink drop control arrangement for receiving pixel data indicative of a desired number of ink droplets per color per pixel in an image to be printed;

said ink drop control arrangement being responsive to the pixel data for determining an ink droplet distribution pattern for said desired number of ink droplets over N number of ink droplet depositing opportunities;

said distribution pattern limiting the maximum number of droplets of any one ink color in any individual one of the N number of depositing opportunities to X number of droplets, where X equals the total number of droplets of any one ink color divided by the N number of depositing opportunities; and a plurality of sequenced pseudo-random number generators responsive to said control arrangement for assigning randomly each set of X number of droplets of any one ink color to individual ones of the N number of depositing opportunities.

26. An inkjet color printer, comprising:

means for determining a total number of droplets of each colorant ink in a plurality of different colorant inks to be deposited at a given pixel location;

means for determining once for said total number of droplets of each colorant ink to be deposited at said given pixel location in a substantially even rate ink droplet distribution for each colorant ink to be deposited over N number of available passes available; and means for assigning an individual one of the N number of passes to each individual colorant ink droplet to be deposited at said given pixel location to effect said substantially even drop distribution at said given pixel location.

* * * * *